(12) United States Patent
Uchida

(10) Patent No.: US 11,408,360 B2
(45) Date of Patent: Aug. 9, 2022

(54) ENGINE DEVICE

(71) Applicant: TOYOTA JIDOSHA KABUSHIKI KAISHA, Toyota (JP)

(72) Inventor: Akito Uchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/148,769

(22) Filed: Jan. 14, 2021

(65) Prior Publication Data

US 2021/0285392 A1 Sep. 16, 2021

(30) Foreign Application Priority Data

Mar. 12, 2020 (JP) .............................. JP2020-042922

(51) Int. Cl.
*F02D 41/00* (2006.01)
*F02B 37/18* (2006.01)
*F02B 37/12* (2006.01)
*F02D 23/00* (2006.01)

(52) U.S. Cl.
CPC .......... *F02D 41/0007* (2013.01); *F02B 37/18* (2013.01); *F02B 2037/122* (2013.01); *F02D 23/00* (2013.01); *F02D 2200/0406* (2013.01)

(58) Field of Classification Search
CPC ................. F02D 41/0007; F02D 23/00; F02D 2200/0406; F02B 37/18; F02B 2037/122
See application file for complete search history.

(56) References Cited

U.S. PATENT DOCUMENTS

2006/0248889 A1  11/2006  Sagisaka et al.
2009/0055072 A1*  2/2009  He .................... F02D 41/222
                                                    701/102

FOREIGN PATENT DOCUMENTS

JP          2007-009877 A       1/2007

\* cited by examiner

*Primary Examiner* — Audrey B. Walter
*Assistant Examiner* — Edward Bushard
(74) *Attorney, Agent, or Firm* — Finnegan, Henderson, Farabow, Garrett & Dunner, LLP

(57) ABSTRACT

An engine device is equipped with an engine, a supercharger having a turbine, a compressor and a waste gate valve, and a control device that controls the engine and the supercharger, and that performs an abnormality diagnosis of a relationship between an intake air amount of the engine and a supercharging pressure as a pressure downstream of the compressor in the intake pipe. The control device performs boost control for controlling the waste gate valve such that the supercharging pressure becomes higher when a predetermined condition is fulfilled than when the predetermined condition is not fulfilled. The control device further sets a threshold for use in the abnormality diagnosis, based on whether or not the boost control is performed.

6 Claims, 6 Drawing Sheets

ENGINE DEVICE

CROSS-REFERENCE TO RELATED APPLICATION

This application claims priority to Japanese Patent Application No. 2020-042922 filed on Mar. 12, 2020, incorporated herein by reference in its entirety.

BACKGROUND

1. Technical Field

The present disclosure relates to an engine device.

2. Description of Related Art

Conventionally, as this type of engine device, there is proposed an engine device equipped with an engine, a turbine that is arranged in an exhaust pipe of the engine, a compressor that is arranged in an intake pipe of the engine and that is driven by the turbine, and a supercharger having a waste gate valve that is provided in a bypass pipe establishing communication between an upstream side and a downstream side of the turbine in the exhaust pipe (e.g., see Japanese Unexamined Patent Application Publication No. 2007-9877 (JP 2007-9877 A)). This engine device forcibly changes a control signal for controlling the opening degree of the waste gate valve when the engine is in a steady operating state, and determines, based on a supercharging pressure at that time, whether or not there is an abnormality in characteristics of changes in the supercharging pressure with respect to changes in the control signal.

SUMMARY

In this engine device, boost control for controlling the waste gate valve such that the supercharging pressure becomes higher when a predetermined condition is fulfilled than when the predetermined condition is not fulfilled may be performed. In this case, if an abnormality diagnosis of a relationship between an intake air amount and the supercharging pressure is performed through the use of a constant threshold regardless of whether or not boost control is performed, an erroneous diagnosis may be incurred.

An engine device according to the present disclosure aims mainly at restraining an erroneous diagnosis from being caused in an abnormality diagnosis of a relationship between an intake air amount and a supercharging pressure.

The engine device according to the present disclosure adopts the following measure to achieve the foregoing main aim.

The engine device according to the present disclosure is equipped with an engine, a supercharger having a turbine that is arranged in an exhaust pipe of the engine, a compressor that is arranged in an intake pipe of the engine and that is driven by the turbine, and a waste gate valve that is provided in a bypass pipe for establishing communication between an upstream side and a downstream side of the turbine in the exhaust pipe, and a control device that controls the engine and the supercharger, and that performs an abnormality diagnosis of a relationship between an intake air amount of the engine and a supercharging pressure as a pressure downstream of the compressor in the intake pipe. The control device performs boost control for controlling the waste gate valve such that the supercharging pressure becomes higher when a predetermined condition is fulfilled than when the predetermined condition is not fulfilled. The control device further sets a threshold for use in the abnormality diagnosis, based on whether or not the boost control is performed.

In the engine device according to the present disclosure, the boost control for controlling the waste gate valve such that the supercharging pressure becomes higher when the predetermined condition is fulfilled than when the predetermined condition is not fulfilled is performed. Furthermore, the threshold for use in the abnormality diagnosis of the relationship between the intake air amount and the supercharging pressure is set based on whether or not the boost control is performed. Thus, an erroneous diagnosis can be restrained from being caused in the abnormality diagnosis of the relationship between the intake air amount and the supercharging pressure.

In the engine device according to the present disclosure, the control device may perform the abnormality diagnosis through a comparison between the intake air amount and a permissible upper limit of the intake air amount based on the supercharging pressure. The control device may further set the permissible upper limit such that the permissible upper limit becomes smaller when the boost control is performed than when the boost control is not performed. This is because the inventors have found out, through an experiment or an analysis, that the intake air amount for the same supercharging pressure is likely to be lower when the boost control is performed than when the boost control is not performed.

In this case, the control device may refrain from performing the abnormality diagnosis until a predetermined time elapses since the start of the performance of the boost control. In the case where the permissible upper limit is made smaller when the boost control is performed than when the boost control is not performed, an erroneous diagnosis is likely to be caused in the abnormality diagnosis due to a sudden decrease in the permissible upper limit immediately after the start of the performance of the boost control. As a measure against this, by refraining from performing the abnormality diagnosis until the predetermined time elapses since the start of the performance of the boost control, an erroneous diagnosis during this period can be avoided.

Besides, in this case, the control device may set the permissible upper limit such that the permissible upper limit becomes larger when a rotational speed of the engine is high than when the rotational speed of the engine is low. This is because the amount of exhaust energy decreases and the amount of intake air that is needed to realize the same supercharging pressure increases as the rotational speed of the engine rises.

In the engine device according to the present disclosure, the control device may set, as the threshold, the same value as when the boost control is not performed, in a case where a boost amount of the supercharging pressure for a time when the boost control is not performed is equal to or smaller than a predetermined amount while the boost control is performed. This is because the case where the influence of the boost control is small may be regarded as identical to the case where the boost control is not performed.

In the engine device according to the present disclosure, the control device may control the waste gate valve such that the supercharging pressure becomes higher by a boost amount based on a required supercharging pressure and/or the intake air amount when the boost control is performed than when the boost control is not performed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Next, a mode for carrying out the present disclosure will be described using the embodiments.

Figure 1:
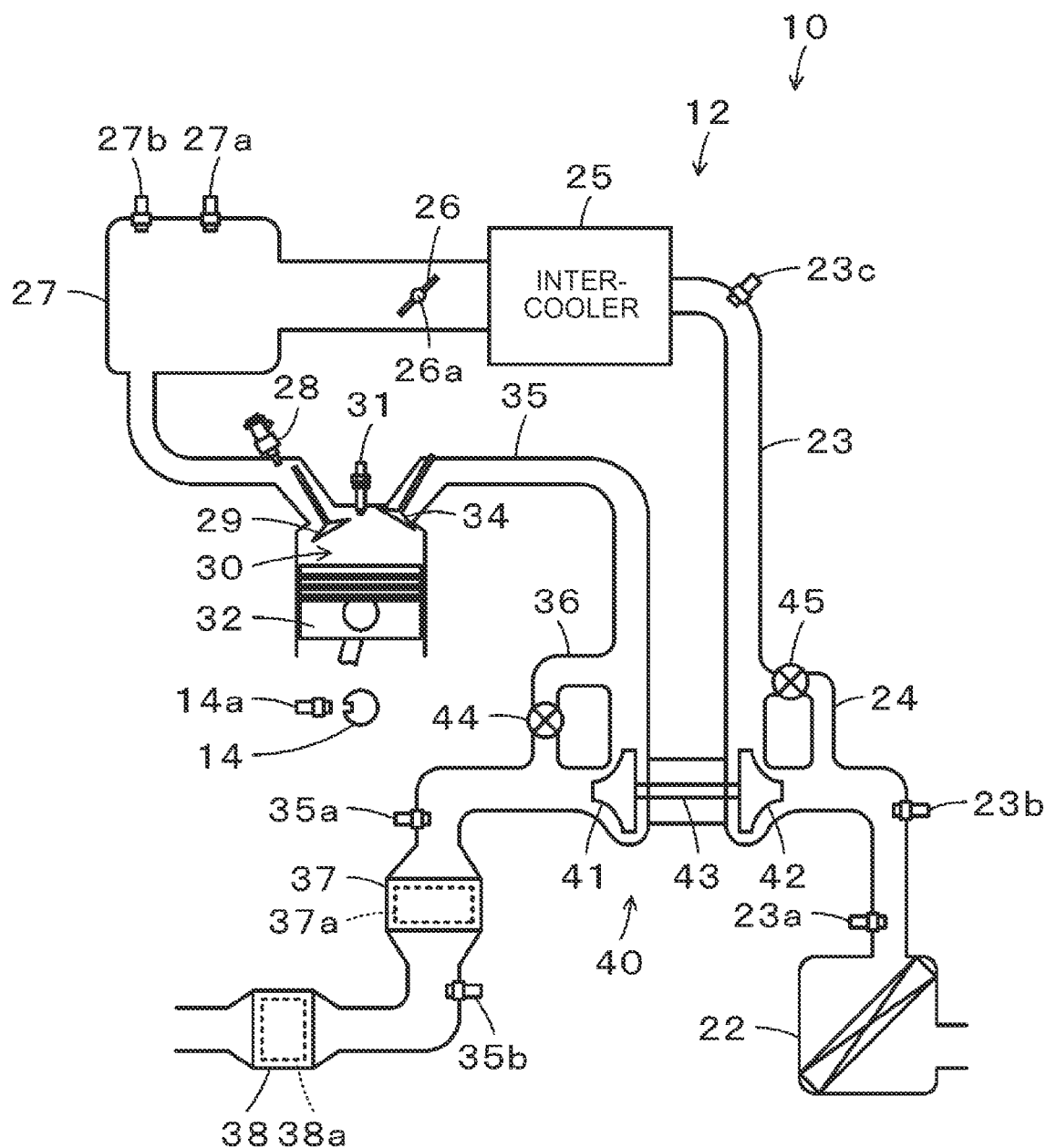
FIG. 1 is a configuration view showing the outline of the configuration of an engine device 10 as one of the embodiments of the present disclosure.
Figure 2:
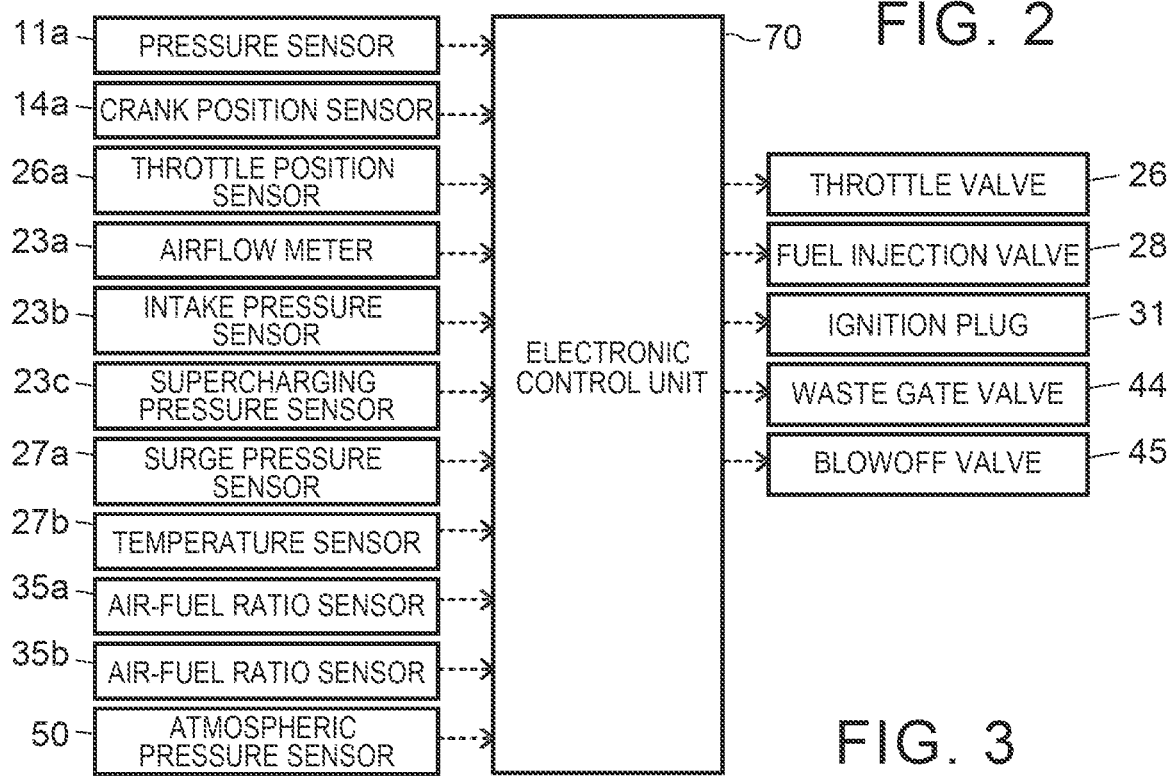
FIG. 2 is an illustrative view showing an example of signals input to and output from an electronic control unit 70.

FIG. 1 is a configuration view showing the outline of the configuration of an engine device 10 as one of the embodiments of the present disclosure. FIG. 2 is an illustrative view showing an example of signals input to and output from an electronic control unit 70. The engine device 10 according to the embodiment is mounted in common automobiles and various hybrid automobiles, and is equipped with an engine 12, a supercharger 40, and the electronic control unit 70 as shown in FIGS. 1 and 2.

The engine 12 is configured as an internal combustion engine that outputs motive power through the use of fuel such as gasoline, light oil, or the like. The engine 12 sucks the air cleaned by an air cleaner 22 into an intake pipe 23, causes the air to sequentially flow past an intercooler 25, a throttle valve 26, and a surge tank 27, injects fuel from a fuel injection valve 28 downstream of the surge tank 27 in the intake pipe 23, and mixes the air and the fuel with each other. Then, the engine 12 sucks this air-fuel mixture into a combustion chamber 30 via an intake valve 29, and burns the air-fuel mixture through explosion with the aid of electric sparks generated by an ignition plug 31. Then, the engine 12 converts reciprocating motion of a piston 32 that is depressed due to the energy resulting from the combustion through explosion into rotating motion of a crankshaft 14. The exhaust gas that is discharged from the combustion chamber 30 to an exhaust pipe 35 via an exhaust valve 34 is discharged to outside air via exhaust gas control devices 37 and 38 having catalysts (three-way catalysts) 37a and 38a for removing noxious components such as carbon monoxide (CO), hydrocarbons (HC), and nitrogen oxides (NOx) respectively.

The supercharger 40 is configured as a turbocharger, and is equipped with a turbine 41, a compressor 42, a waste gate valve 44, and a blowoff valve 45. The turbine 41 is arranged upstream of the exhaust gas control device 37 in the exhaust pipe 35. The compressor 42 is arranged upstream of the intercooler 25 in the intake pipe 23, and is coupled to the turbine 41 via a coupling shaft 43. Accordingly, the compressor 42 is driven by the turbine 41. The waste gate valve 44 is provided in a bypass pipe 36 for establishing communication between an upstream side and a downstream side of the turbine 41 in the exhaust pipe 35, and is controlled by the electronic control unit 70. The blowoff valve 45 is provided in a bypass pipe 24 for establishing communication between an upstream side and a downstream side of the compressor 42 in the intake pipe 23, and is controlled by the electronic control unit 70.

In the supercharger 40, through the adjustment of the opening degree of the waste gate valve 44, the distribution ratio between an amount of exhaust gas flowing through the bypass pipe 36 and an amount of exhaust gas flowing through the turbine 41 is adjusted, the rotational driving force of the turbine 41 is adjusted, the amount of air compressed by the compressor 42 is adjusted, and the supercharging pressure (intake pressure) of the engine 12 is adjusted. It should be noted herein that the distribution ratio is adjusted, more specifically, such that the amount of exhaust gas flowing through the bypass pipe 36 decreases and the amount of exhaust gas flowing through the turbine 41 increases as the opening degree of the waste gate valve 44 decreases. Incidentally, when the waste gate valve 44 is fully open, the engine 12 can operate in the same manner as a natural intake-type engine that is not equipped with the supercharger 40.

Besides, in the supercharger 40, when the pressure downstream of the compressor 42 in the intake pipe 23 is higher than the pressure upstream of the compressor 42 in the intake pipe 23 by a certain value, the surplus pressure downstream of the compressor 42 can be released by opening the blowoff valve 45. Incidentally, the blowoff valve 45 may be configured as a check valve that opens when the pressure downstream of the compressor 42 in the intake pipe 23 becomes higher than the pressure upstream of the compressor 42 in the intake pipe 23 by a certain value, instead of a valve that is controlled by the electronic control unit 70.

The electronic control unit 70 is configured as a microprocessor that is mainly constituted of a CPU, and is equipped with a ROM that stores a processing program, a RAM that temporarily stores data, input/output ports, and a communication port in addition to the CPU. Signals from various sensors are input to the electronic control unit 70 via the input ports respectively.

As the signals that are input to the electronic control unit 70, it is possible to mention, for example, a crank angle θcr from a crank position sensor 14a that detects a rotational position of the crankshaft 14 of the engine 12, a coolant temperature Tw from a coolant temperature sensor (not shown) that detects a temperature of coolant in the engine 12, and a throttle opening degree TH from a throttle position sensor 26a that detects an opening degree of the throttle valve 26. It is also possible to mention a cam position θca from a cam position sensor (not shown) that detects a rotational position of an intake cam shaft for opening/closing the intake valve 29 or an exhaust cam shaft for opening/closing the exhaust valve 34. It is also possible to mention an intake air amount Qa from an airflow meter 23a attached to the upstream side of the compressor 42 in the intake pipe 23, an intake pressure Pin from an intake pressure sensor 23b attached to the upstream side of the compressor 42 in the intake pipe 23, and a supercharging pressure Pc from a supercharging pressure sensor 23c attached to a region between the compressor 42 and the intercooler 25 in the intake pipe 23. It is also possible to mention a surge pressure Ps from a surge pressure sensor 27a attached to the surge tank 27, and a surge temperature Ts from a temperature sensor 27b attached to the surge tank 27. It is also possible to mention a front air-fuel ratio AF1 from a front air-fuel ratio sensor 35a attached to an upstream side of the exhaust gas control device 37 in the exhaust pipe 35, and a rear air-fuel ratio AF2 from a rear air-fuel ratio sensor 35b attached to a region between the exhaust gas control device 37 and the exhaust gas control device 38 in the exhaust pipe 35. It is also possible to mention an atmospheric pressure Pout from an atmospheric pressure sensor 50.

Various control signals are output from the electronic control unit 70 via the output ports respectively. As signals that are output from the electronic control unit 70, it is possible to mention, for example, a control signal to the throttle valve 26, a control signal to the fuel injection valve 28, and a control signal to the ignition plug 31. It is also possible to mention a control signal to the waste gate valve 44, and a control signal to the blowoff valve 45.

The electronic control unit 70 computes a rotational speed Ne of the engine 12 based on the crank angle θcr from the crank position sensor 14a. Besides, the electronic control unit 70 computes a load factor (a ratio of a volume of air actually sucked on a single cycle to a cylinder capacity of the engine 12 per cycle) KL based on the intake air amount Qa from the airflow meter 23a and the rotational speed Ne of the engine 12.

In the engine device 10 according to the embodiment thus configured, the electronic control unit 70 performs intake air amount control for controlling the opening degree of the throttle valve 26, fuel injection control for controlling the amount of fuel injection from the fuel injection valve 28, ignition control for controlling the ignition timing of the ignition plug 31, supercharging control for controlling the opening degree of the waste gate valve 44, and the like, based on a required load factor KL* of the engine 12.

Intake air amount control is performed by, for example, setting a target intake air amount Qa* based on the required load factor KL*, setting a target opening degree TH* of the throttle valve 26 such that the intake air amount Qa becomes equal to the target intake air amount Qa*, and controlling the throttle valve 26 such that the throttle opening degree TH becomes equal to the target opening degree TH*. Fuel injection control is performed by, for example, setting a target fuel injection amount Qf* of the fuel injection valve 28, based on the intake air amount Qa, such that the front air-fuel ratio AF1 becomes equal to a target air-fuel ratio AF* (e.g., a theoretical air-fuel ratio), and controlling the fuel injection valve 28 through the use of the set target fuel injection amount Qf*.

Ignition control is performed by, for example, setting a target ignition timing Tf* of the ignition plug 31 based on the rotational speed Ne and the required load factor KL* of the engine 12, and controlling the ignition plug 31 through the use of the set target ignition timing Tf*. Supercharging control will be described later.

Figure 3:
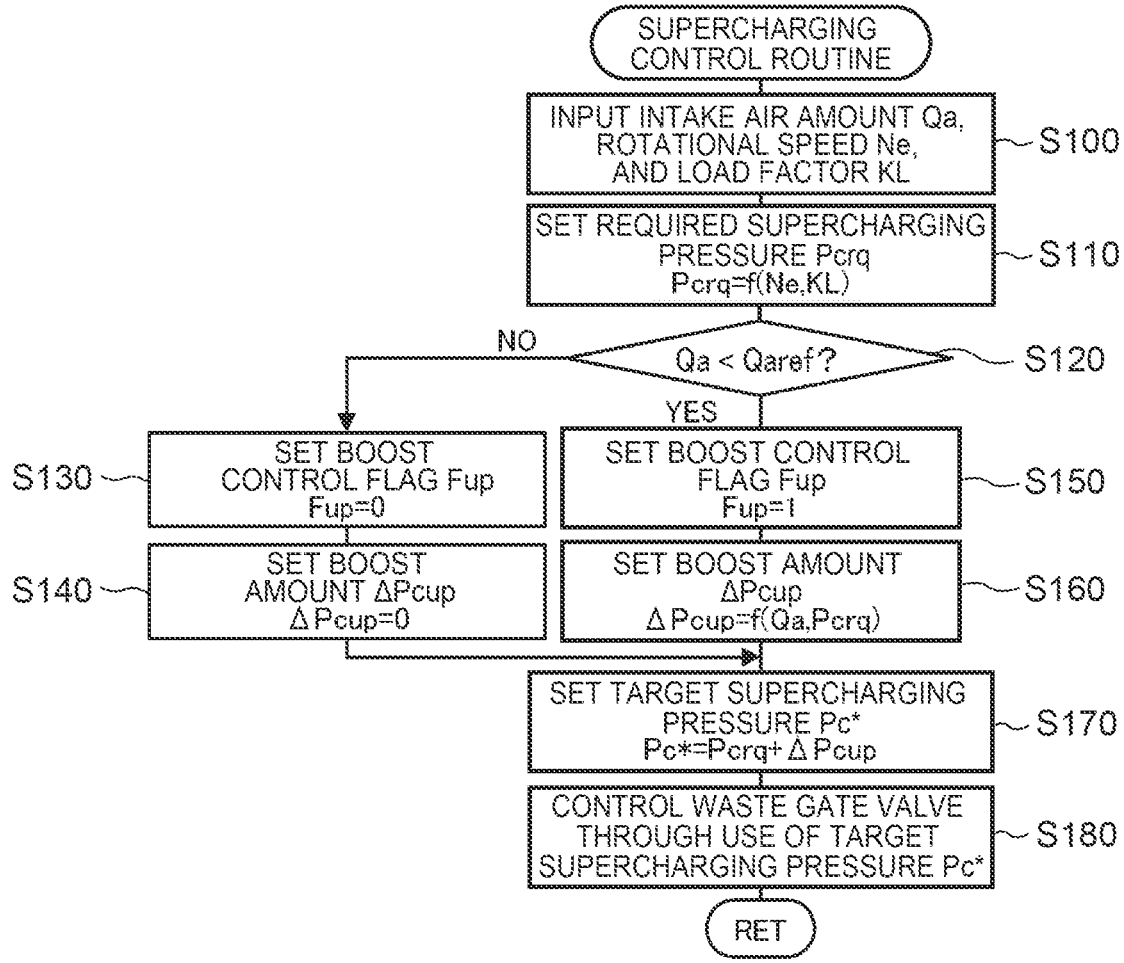
FIG. 3 is a flowchart showing an example of a supercharging control routine that is carried out by the electronic control unit 70.

Next, the operation of the engine device 10 according to the embodiment thus configured, especially supercharging control and an abnormality diagnosis of a relationship between the intake air amount Qa and the supercharging pressure Pc will be described. The following description will be given in this sequence. FIG. 3 is a flowchart showing an example of a supercharging control routine that is carried out by the electronic control unit 70. This routine is repeatedly carried out.

When the supercharging control routine of FIG. 3 is carried out, the electronic control unit 70 first receives input data on the intake air amount Qa, the rotational speed Ne, the load factor KL, and the like of the engine 12 (step S100). It should be noted herein that a value detected by the airflow meter 23a is input as the intake air amount Qa. Values computed by the electronic control unit 70 as described above are input as the rotational speed Ne and the load factor KL.

Upon receiving the input data in this manner, the electronic control unit 70 sets a required supercharging pressure Pcrq based on the rotational speed Ne and the load factor KL of the engine 12 (step S110). Subsequently, the electronic control unit 70 compares the intake air amount Qa of the engine 12 with a threshold Qaref (step S120). It should be noted herein that the threshold Qaref is a threshold that is used to determine whether or not boost control for making the supercharging pressure Pc higher than during normal control should be permitted. If boost control is performed when the intake air amount Qa is large, a driver may feel a shock or a feeling of jumping out due to an increase in torque of the engine 12 at the time of a changeover from normal control to boost control. Therefore, it is preferable to refrain from performing boost control when the intake air amount Qa is large. In the embodiment, the processing of step S120 is performed in this light.

If the intake air amount Qa of the engine 12 is equal to or larger than the threshold Qaref in step S120, the electronic control unit 70 determines that the performance of boost control should not be permitted, and sets a value 0 for a boost control flag Fup (step S130). It should be noted herein that the boost control flag Fup is a flag indicating whether or not boost control is performed. Subsequently, the electronic control unit 70 sets the value 0 as a boost amount ΔPcup (step S140), sets a value obtained by adding the boost amount ΔPcup to the required supercharging pressure Pcrq, as a target supercharging pressure Pc* (step S170), controls the waste gate valve 44 based on the set target supercharging pressure Pc* (step S180), and ends the present routine. The control of the waste gate valve 44 through the use of the target supercharging pressure Pc* that is equal to the required supercharging pressure Pcrq is equivalent to the foregoing "normal control".

If the intake air amount Qa of the engine 12 is smaller than the threshold Qaref in step S120, the electronic control unit 70 determines that the performance of boost control should be permitted, and sets a value 1 for the boost control flag Fup (step S150). Subsequently, the electronic control unit 70 sets the boost amount ΔPcup within a positive range based on the intake air amount Qa and the required supercharging pressure Pcrq (step S160), sets a value obtained by adding the set boost amount ΔPcup to the required supercharging pressure Pcrq, as the target supercharging pressure Pc* (step S170), controls the waste gate valve 44 based on the set target supercharging pressure Pc* (step S180), and ends the present routine. The control of the waste gate valve 44 through the use of the target supercharging pressure Pc* that is higher than the required supercharging pressure Pcrq is equivalent to the foregoing "boost control".

It should be noted herein that the boost amount ΔPcup is set through the use of the intake air amount Qa, the required supercharging pressure Pcrq, and a boost amount setting map. The boost amount setting map is determined in advance as a relationship showing how the boost amount ΔPcup is related to the intake air amount Qa and the required supercharging pressure Pcrq, and is stored in the ROM (not shown). The boost amount ΔPcup is set in such a manner as to increase, for example, as the intake air amount Qa decreases, and as the required supercharging pressure Pcrq rises.

Figure 4:
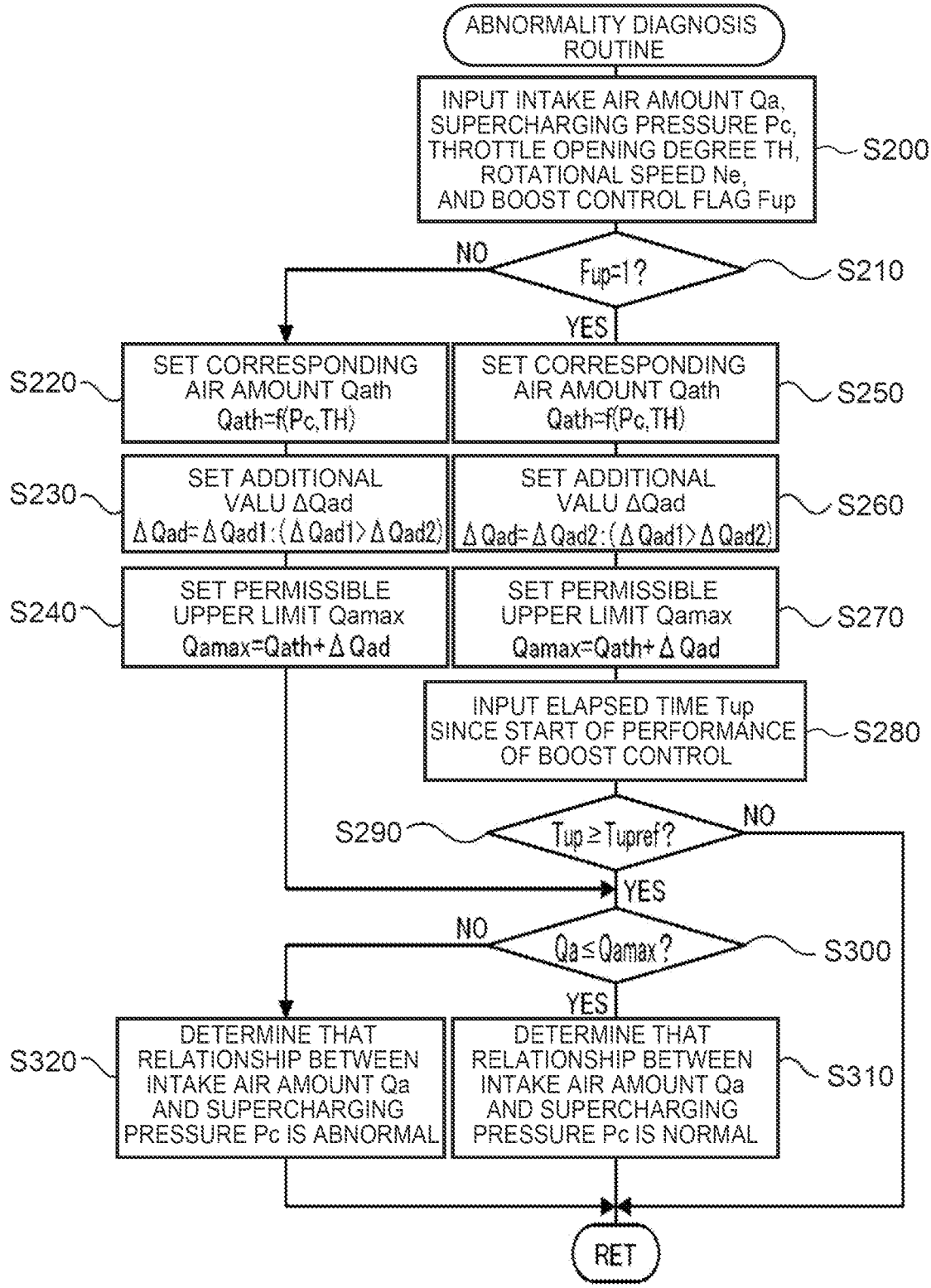
FIG. 4 is a flowchart showing an example of an abnormality diagnosis routine that is carried out by the electronic control unit 70.

Next, an abnormality diagnosis of a relationship between the intake air amount Qa and the supercharging pressure Pc will be described. FIG. 4 is a flowchart showing an example of an abnormality diagnosis routine that is carried out by the electronic control unit 70. This routine is repeatedly carried out.

When the abnormality diagnosis routine of FIG. 4 is carried out, the electronic control unit 70 first receives input data on the intake air amount Qa and the rotational speed Ne of the engine 12, the supercharging pressure Pc, the throttle opening degree TH, the boost control flag Fup, and the like (step S200). It should be noted herein that the intake air amount Qa and the rotational speed Ne are input in the same manner as in step S100 of the supercharging control routine of FIG. 3. A value detected by the supercharging pressure sensor 23c is input as the supercharging pressure Pc. A value detected by the throttle position sensor 26a is input as the throttle opening degree TH. A value set by the supercharging control routine of FIG. 3 is input as the boost control flag Fup.

Upon receiving the input data in this manner, the electronic control unit 70 checks the value of the boost control flag Fup (step S210). When the value of the boost control flag Fup is 0, the electronic control unit 70 determines that boost control is not performed. Subsequently, the electronic control unit 70 sets a corresponding air amount Qath as an intake air amount (a theoretical value) corresponding to the supercharging pressure Pc (step S220), sets a value ΔQad1 as the additional value ΔQad (step S230), and sets a value obtained by adding the additional value ΔQad to the corresponding air amount Qath, as the permissible upper limit Qamax (step S240).

Figure 5:
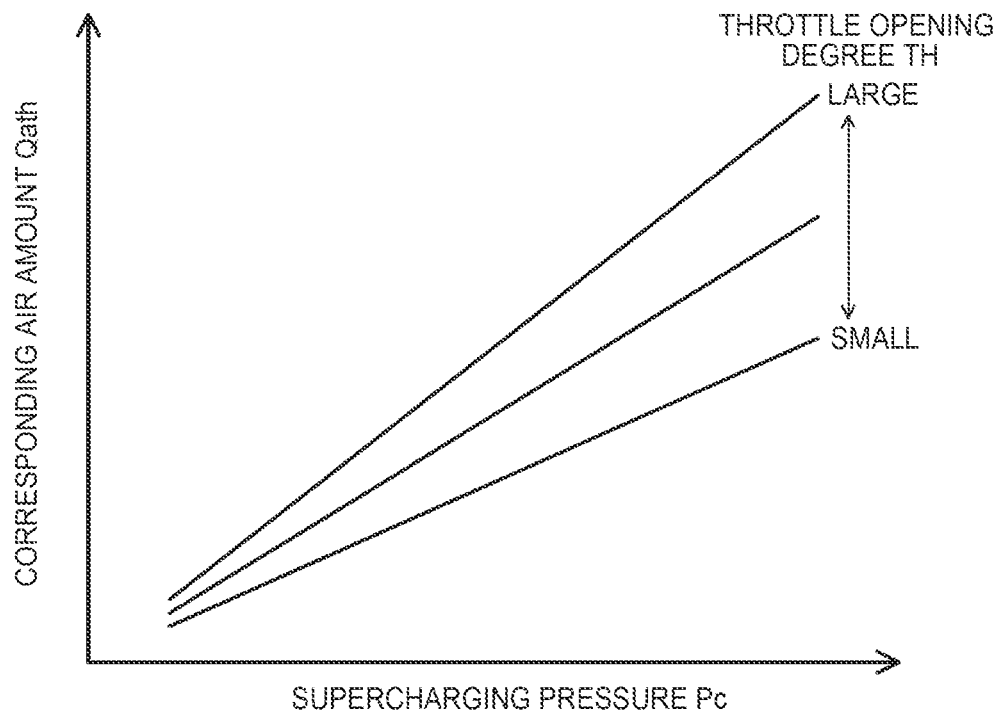
FIG. 5 is an illustrative view showing an example of a corresponding air amount setting map.

It should be noted herein that the corresponding air amount Qath is set through the use of the supercharging pressure Pc, the throttle opening degree TH, and a corresponding air amount setting map. The corresponding air amount setting map is determined in advance as a relationship among the supercharging pressure Pc, the throttle opening degree TH, and the corresponding air amount Qath, and is stored in the ROM (not shown). FIG. 5 is an illustrative view showing an example of the corresponding air amount setting map. As shown in FIG. 5, the corresponding air amount Qath is set in such a manner as to increase as the supercharging pressure Pc rises and as the throttle opening degree TH increases. The permissible upper limit Qamax is an upper limit of a permissible range of the intake air amount Qa (a range that makes it possible to determine that the relationship between the intake air amount Qa and the supercharging pressure Pc is normal).

Upon setting the permissible upper limit Qmax in this manner, the electronic control unit 70 compares the intake air amount Qa with the permissible upper limit Qamax (step S300). When the intake air amount Qa is equal to or smaller than the permissible upper limit Qamax, the electronic control unit 70 determines that the relationship between the intake air amount Qa and the supercharging pressure Pc is normal (step S310), and ends the present routine.

When the intake air amount Qa is larger than the permissible upper limit Qamax in step S300, the electronic control unit 70 determines that the relationship between the intake air amount Qa and the supercharging pressure Pc is abnormal (step S320), and ends the present routine. In this case, the electronic control unit 70 performs failsafe supercharging control instead of the supercharging control routine of FIG. 3, as to supercharging control. In failsafe supercharging control, the electronic control unit 70 controls the waste gate valve 44 such that the supercharging pressure Pc becomes lower than when the supercharging control routine of FIG. 3 is carried out. For example, the electronic control unit 70 fully opens the waste gate valve 44 such that the engine 12 operates in the same manner as a natural intake-type engine that is not equipped with the supercharger 40.

When the intake air amount Qa is larger than the permissible upper limit Qamax, the supercharging pressure Pc detected by the supercharging pressure sensor 23c may be somewhat lower than an actual supercharging pressure Pcact, as to the supercharging pressure. In this case, the turbine 41 and the compressor 42 may rotate excessively. In this light, according to the embodiment, failsafe supercharging control is performed when the intake air amount Qa is larger than the permissible upper limit Qamax. Thus, the turbine 41 and the compressor 42 can be restrained from rotating excessively.

When the value of the boost control flag Fup is 1 in step S210, the electronic control unit 70 determines that boost control is performed. Subsequently, the electronic control unit 70 sets the corresponding air amount Qath corresponding to the supercharging pressure Pc in the same manner as in the processing of step S220 (step S250), sets a value ΔQ2 that is smaller than the value ΔQ1, as the additional value ΔQad (step S260), and sets a value obtained by adding the additional value ΔQad to the corresponding air amount Qath, as the permissible upper limit Qamax (step S270).

Then, the electronic control unit 70 receives an elapsed time Tup since the start of the performance of boost control (step S280), and compares the received elapsed time Tup with a threshold Tupref (step S290). Then, when the elapsed time Tup is shorter than the threshold Tupref, the electronic control unit 70 ends the present routine without performing an abnormality diagnosis of the relationship between the intake air amount Qa and the supercharging pressure Pc (without carrying out steps S300 to S320). It should be noted herein that the elapsed time Tup is input by reading a value of a timer (not shown) that starts measuring time upon the start of the performance of boost control. The meaning of the threshold Tupref, and the reason why the abnormality diagnosis of the relationship between the intake air amount Qa and the supercharging pressure Pc is not performed when the elapsed time Tup is shorter than the threshold Tupref will be described later.

If the elapsed time Tup is equal to or longer than the threshold Tupref in step S290, the electronic control unit 70 performs the abnormality diagnosis of the relationship between the intake air amount Qa and the supercharging pressure Pc through a comparison between the intake air amount Qa and the permissible upper limit Qamax (steps S300 to S320), and ends the present routine.

Figure 6:
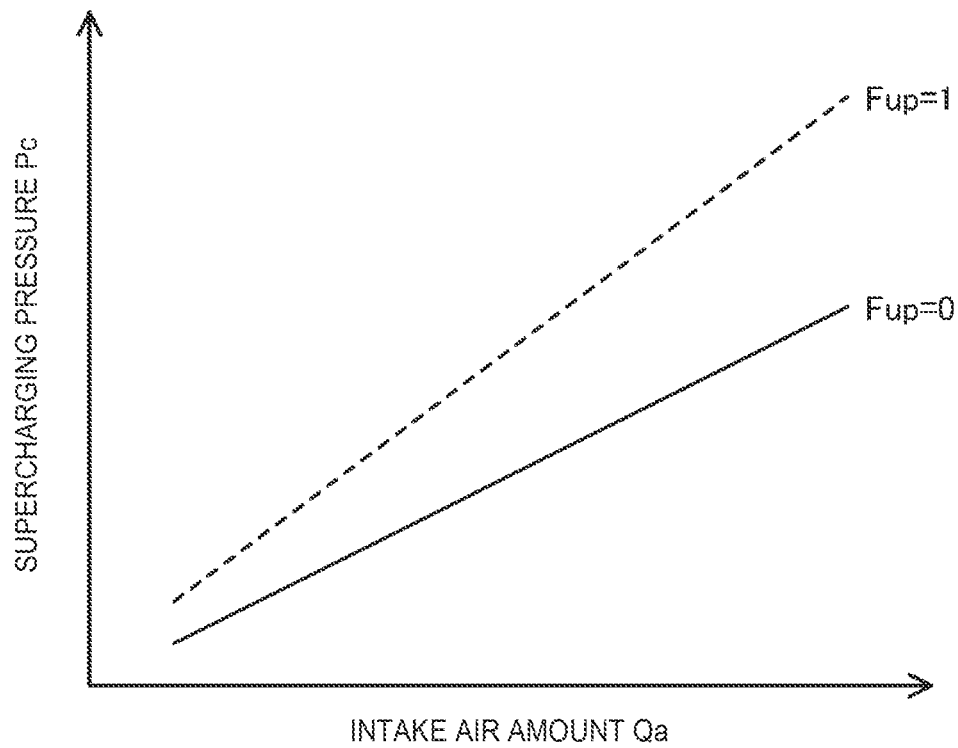
FIG. 6 is an illustrative view showing an example of a relationship between an intake air amount Qa and a supercharging pressure Pc at the time when the relationship between the intake air amount Qa and the supercharging pressure Pc is normal.

The reason why the permissible upper limit Qamax is made smaller by reducing the additional value ΔQad when boost control is performed than when boost control is not performed will now be described. FIG. 6 is an illustrative view showing an example of the relationship between the intake air amount Qa and the supercharging pressure Pc when the relationship between the intake air amount Qa and the supercharging pressure Pc is normal. This relationship is a relationship determined by the inventors through an experiment or an analysis. In FIG. 6, the relationship at the time when boost control is not performed (when the value of the boost control flag Fup is 0) is indicated by a solid line, and the relationship at the time when boost control is performed (when the value of the boost control flag Fup is 1) is indicated by a broken line. As shown in FIG. 6, it is understood that the intake air amount Qa for the same supercharging pressure Pc is smaller when boost control is performed than when boost control is not performed. In this light, according to the embodiment, the additional value ΔQad and hence the permissible upper limit Qamax are set as described above. Thus, the abnormality diagnosis of the relationship between the intake air amount Qa and the supercharging pressure Pc can be more appropriately performed depending on whether or not boost control is performed.

Figure 7:
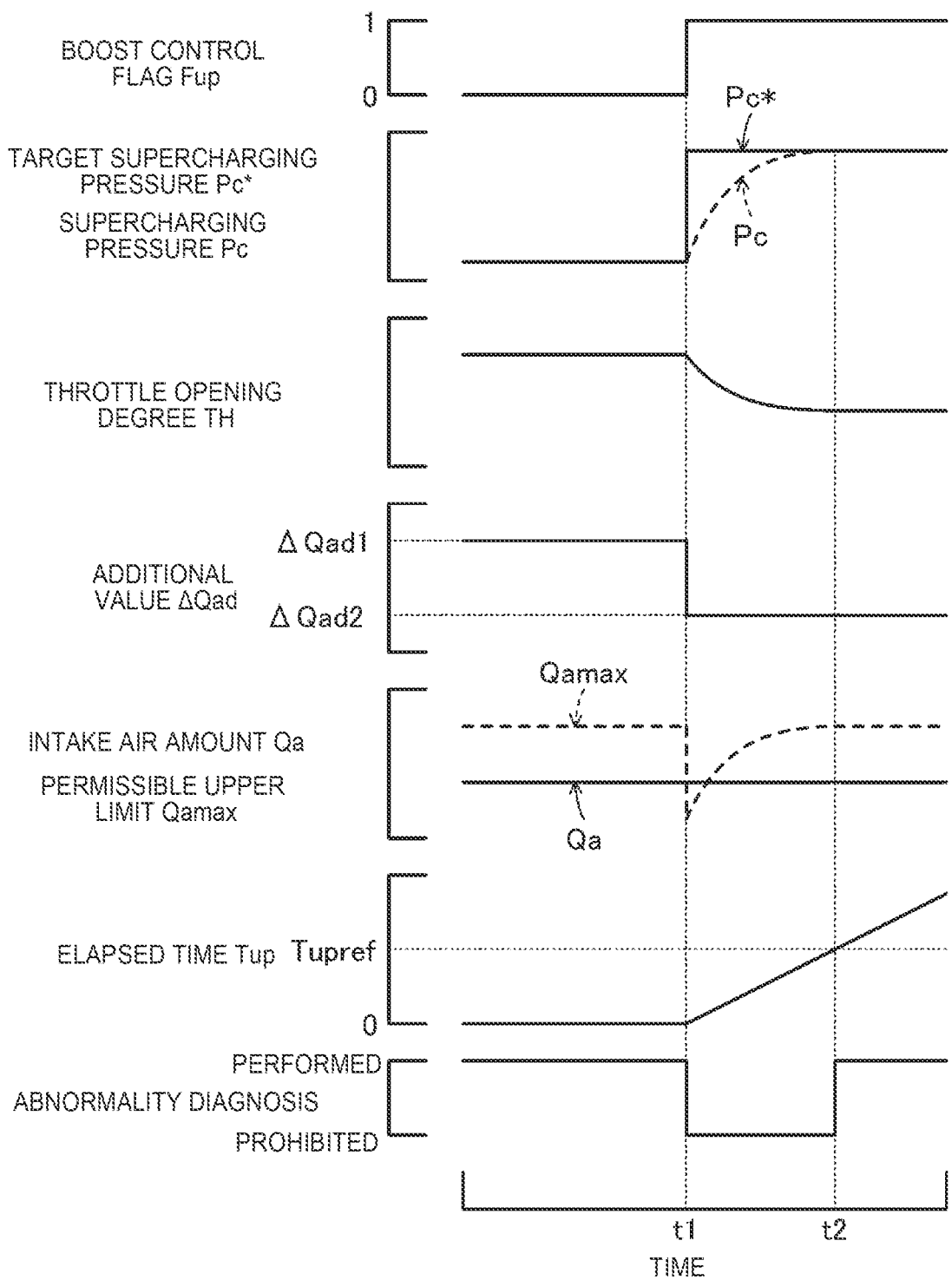
FIG. 7 is an illustrative view showing an example of a boost control flag Fup, a target supercharging pressure Pc*, a supercharging pressure Pc, a throttle opening degree TH, an additional value ΔQad, the intake air amount Qa, a permissible upper limit Qamax, an elapsed time Tup. and whether or not an abnormality diagnosis is performed.

Subsequently, the reason why the abnormality diagnosis of the relationship between the intake air amount Qa and the supercharging pressure Pc is not performed when the elapsed time Tup since the start of the performance of boost control is shorter than the threshold Tupref will be described. FIG. 7 is an illustrative view showing an example of the boost control flag Fup, the target supercharging pressure Pc*, the supercharging pressure Pc, the throttle opening degree TH, the additional value ΔQad, the intake air amount Qa, the permissible upper limit Qamax, the elapsed time Tup, and whether or not the abnormality diagnosis is performed. In the embodiment, when the performance of boost control is started (at a timing t1), the additional value ΔQad is changed over from the value ΔQad1 to the value ΔQad2 that is smaller than the value ΔQad1. In view of this and the fact that the change in the supercharging pressure Pc (the corresponding air amount Qath) before and after the start of the performance of boost control is small, the permissible upper limit ΔQadmax is small immediately after the start of the performance of boost control. Therefore, when the abnormality diagnosis of the relationship between the intake air amount Qa and the supercharging pressure Pc is performed in this case, this relationship may be erroneously diagnosed as abnormality in spite of its normalness. In this light, according to the embodiment, the abnormality diagnosis of the relationship between the intake air amount Qa and the supercharging pressure Pc is not performed when the elapsed time Tup since the start of the performance of boost control is shorter than the threshold Tupref. Thus, an erroneous diagnosis in this abnormality diagnosis can be avoided. The threshold Tupref is determined in advance through an experiment or an analysis such that this erroneous diagnosis can be avoided.

In the engine device 10 according to the embodiment described above, the abnormality diagnosis of the relationship between the intake air amount Qa and the supercharging pressure Pc is performed through a comparison between the intake air amount Qa and the permissible upper limit Qamax based on the supercharging pressure Pc. In this case, the permissible upper limit Qamax is set smaller when boost control is performed than when boost control is not performed. Thus, an erroneous diagnosis in the abnormality diagnosis of the relationship between the intake air amount and the supercharging pressure can be suppressed.

Moreover, the engine device 10 refrains from performing the abnormality diagnosis of the relationship between the intake air amount Qa and the supercharging pressure Pc, until the lapse of a predetermined time Tupref since the start of the performance of boost control. Thus, an erroneous diagnosis during this period can be avoided.

In the engine device 10 according to the embodiment, boost control is not performed when the intake air amount Qa is equal to or larger than the threshold Qaref, and boost control is performed when the intake air amount Qa is smaller than the threshold Qaref. However, even in the case where the intake air amount Qa is smaller than the threshold Qaref, boost control may not be performed when a prohibition condition is fulfilled.

It should be noted herein that, for example, a condition that temperatures Tc1 and Tc2 of the catalysts 37a and 38a of the exhaust gas control devices 37 and 38 are lower than thresholds Tcref1 and Tcref2 respectively can be mentioned as the prohibition condition. The thresholds Tcref1 and Tcref2 are thresholds that are used to determine whether or not the warm-up of the catalysts 37a and 38a is required respectively. When boost control is performed, the amount of exhaust gas flowing through the bypass pipe 36 becomes smaller, the amount of exhaust gas flowing through the turbine 41 becomes larger, and the amount of thermal energy of exhaust gas taken away by the turbine 41 becomes larger than in the case where boost control is not performed. Therefore, it is preferable to refrain from performing boost control when the warm-up of the catalysts 37a and 38a is required.

Besides, as the prohibition condition, it is also possible to mention a condition that a condensed water amount Qw in the intake pipe 23 is equal to or larger than a threshold Qwref. Condensed water may be produced through the cooling of intake air in the intake pipe 23 by the intercooler 25. The threshold Qwref is a threshold that is used to determine whether or not the condensed water amount Qw in the intake pipe 23 is within a permissible range. It is known that the performance of supercharging control makes it likely to produce condensed water in the intake pipe 23 (the performance of supercharging control makes it more likely to produce condensed water) when the intake air amount Qa is small. Besides, when the condensed water amount Qw is large, corrosion of the fuel injection valve 28 and the like may be caused. For these reasons, it is preferable to refrain from performing boost control when the condensed water amount Qw in the intake pipe 23 is equal to or larger than the threshold Qwref.

In the engine device 10 according to the embodiment, when boost control is performed, the boost amount ΔPcup is set based on the intake air amount Qa and the required supercharging pressure Pcrq of the engine 12. In this case, however, the boost amount ΔPcup may be set based on either the intake air amount Qa or the required supercharging pressure Pcrq. Besides, a post-correction air amount Qaco that is obtained by correcting the intake air amount Qa as to the density of air may be used instead of the intake air amount Qa. It should be noted herein that, for example, a correction using the temperature of intake air in the engine 12 can be mentioned as the correction regarding the density of air. As the temperature of intake air in the engine 12, for example, the atmospheric pressure Pout from the atmospheric pressure sensor 50, or the surge pressure sensor 27a can be used.

In the engine device 10 according to the embodiment, when boost control is performed, the waste gate valve 44 is controlled with the target supercharging pressure Pc* set as the sum of the required supercharging pressure Pcrq based on the rotational speed Ne and the load factor KL of the engine 12, and the boost amount ΔPcup based on the intake air amount Qa and the required supercharging pressure Pcrq. However, when boost control is performed, the waste gate valve 44 may be controlled with the target supercharging pressure Pc* directly set based on the rotational speed Ne, the load factor KL, and the intake air amount Qa of the engine 12.

Figure 8:
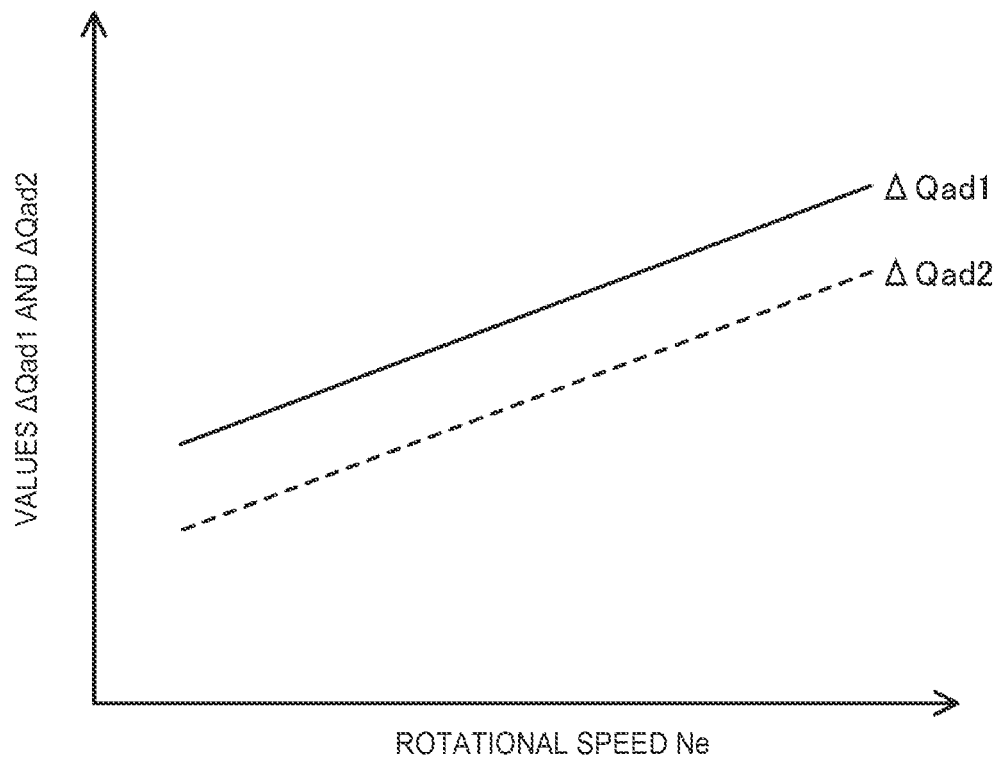
FIG. 8 is an illustrative view showing an example of an additional value setting map.

In the engine device 10 according to the embodiment, the value ΔQad1 is set as the additional value ΔQad when boost control is not performed, the value ΔQad2 that is smaller than the value ΔQad1 is set as the additional value ΔQad when boost control is performed, and the value obtained by adding the additional value ΔQad to the corresponding air amount Qath is set as the permissible upper limit Qamax. It should be noted herein that a constant value is used as each of the values ΔQad1 and ΔQad2. However, a value based on the rotational speed Ne of the engine 12 may be set as each of the values ΔQad1 and ΔQad2. In this case, each of the values ΔQad1 and ΔQad2 may be set through the use of the rotational speed Ne of the engine 12 and an additional value setting map. The additional value setting map is set in advance as a relationship between the rotational speed Ne of the engine 12 and the values ΔQad1 and ΔQad2. FIG. 8 is an illustrative view showing an example of the additional value setting map. As shown in FIG. 8, each of the values ΔQad1 and ΔQad2 is set in such a manner as to increase as the rotational speed Ne of the engine 12 rises. This is because the amount of exhaust energy decreases, and the intake air amount Qa that is needed to realize the same supercharging pressure Pc increases as the rotational speed Ne of the engine 12 rises. The permissible upper limit Qamax can be more appropriately set by setting the additional value ΔQad in this manner.

In the engine device 10 according to the embodiment, the value ΔQad1 is set as the additional value ΔQad when boost control is not performed, the value ΔQad2 that is smaller than the value ΔQad1 is set as the additional value ΔQad when boost control is performed, and the value obtained by adding the additional value ΔQad to the corresponding air amount Qath is set as the permissible upper limit Qamax. However, when boost control is performed and the boost amount ΔPcup is smaller than the threshold ΔPcref, the same value (Qath+ΔQad1) as in the case where boost control is not performed may be set as the permissible upper limit Qamax. This is because the case where the influence of boost control is small may be regarded as identical to the case where boost control is not performed.

In the engine device 10 according to the embodiment, the sum of the corresponding air amount Qath corresponding to the supercharging pressure Pc and the additional value ΔQad based on whether or not boost control is performed is set as the permissible upper limit Qamax, and the abnormality diagnosis of the relationship between the intake air amount Qa and the supercharging pressure Pc is performed through a comparison between the intake air amount Qa and the permissible upper limit Qamax. However, a value obtained by subtracting a subtractive value ΔPst based on whether or not boost control is performed from the corresponding air amount Qath may be set as a permissible lower limit Qamin, and the abnormality diagnosis of the relationship between the intake air amount Qa and the supercharging pressure Pc may be performed through a comparison between the intake air amount Qa and the permissible upper and lower limits Qamax and Qamin.

In the engine device 10 according to the embodiment, the sum of the corresponding air amount Qath corresponding to the supercharging pressure Pc and the additional value ΔQad based on whether or not boost control is performed is set as the permissible upper limit Qamax, and the abnormality diagnosis of the relationship between the intake air amount Qa and the supercharging pressure Pc is performed through a comparison between the intake air amount Qa and the permissible upper limit Qamax. However, a value obtained by subtracting the subtractive value ΔPst based on whether or not boost control is performed from a corresponding supercharging pressure Pcth corresponding to the intake air amount Qa may be set as a permissible lower limit Pcmin, and the abnormality diagnosis of the relationship between the intake air amount Qa and the supercharging pressure Pc may be performed through a comparison between the supercharging pressure Pc and the permissible lower limit Pcmin.

In the embodiment, the engine device 10 is designed to be mounted in common automobiles and various hybrid automobiles. However, the engine device may be designed to be mounted in vehicles other than automobiles, or the engine device may be designed to be mounted in non-mobile facilities such as construction facilities and the like.

A corresponding relationship between the main elements of the embodiment and the main elements of the present disclosure mentioned in the section of means for solving the problem will be described. In the embodiment, the engine 12 is equivalent to "the engine", the supercharger 40 is equivalent to "the supercharger", and the electronic control unit 70 is equivalent to "the control device".

Incidentally, the corresponding relationship between the main elements of the embodiment and the main elements of the present disclosure mentioned in the section of means for solving the problem is an example for concretely illustrating the mode for carrying the present disclosure mentioned in the section of means for solving the problem by the embodiment, and hence is not intended to limit the elements of the present disclosure mentioned in the section of means for solving the problem. That is, the present disclosure mentioned in the section of means for solving the problem should be interpreted based on what is mentioned in the section, and the embodiment is nothing more than a concrete example of the present disclosure mentioned in the section of means for solving the problem.

Although the mode for carrying out the present disclosure has been described above using one of the embodiments, it is obvious that the applicable embodiment should not be limited at all to those embodiments, but can be carried out in various modes within such a range as not to depart from the gist of the present disclosure.

The present disclosure is available for industries for manufacturing engine devices, and the like.

What is claimed is:

1. An engine device comprising:
   an engine;
   a supercharger having a turbine that is arranged in an exhaust pipe of the engine, a compressor that is arranged in an intake pipe of the engine and that is driven by the turbine, and a waste gate valve that is provided in a bypass pipe for establishing communication between an upstream side and a downstream side of the turbine in the exhaust pipe; and
   a control device that controls the engine and the supercharger, and that performs an abnormality diagnosis of a relationship between an intake air amount of the engine and a supercharging pressure as a pressure downstream of the compressor in the intake pipe, wherein the control device performs boost control for controlling the waste gate valve such that the supercharging pressure becomes higher when a predetermined condition is fulfilled as compared to when the predetermined condition is not fulfilled, and the control device further sets a threshold value of one or more of the intake air amount and the supercharging pressure for use in the abnormality diagnosis, based on whether or not the boost control is performed such that the threshold value differs when the boost control is performed as compared to when the boost control is not performed.

2. The engine device according to claim 1, wherein the control device sets, as the threshold value, the same value as when the boost control is not performed, in a case where a boost amount of the supercharging pressure for a time when the boost control is not performed is equal to or smaller than a predetermined amount while the boost control is performed.

3. The engine device according to claim 1, wherein the control device controls the waste gate valve such that the supercharging pressure becomes higher by a boost amount based on a required supercharging pressure and/or the intake air amount when the boost control is performed as compared to when the boost control is not performed.

4. The engine device according to claim 1, wherein the control device performs the abnormality diagnosis through a comparison between the intake air amount and a permissible upper limit of the intake air amount based on the supercharging pressure, and the control device further sets the permissible upper limit such that the permissible upper limit becomes smaller when the boost control is performed than as compared to when the boost control is not performed.

5. The engine device according to claim 4, wherein the control device refrains from performing the abnormality diagnosis until a predetermined time elapses since start of performance of the boost control.

6. The engine device according to claim 4, wherein the control device sets the permissible upper limit such that the permissible upper limit becomes larger when a rotational speed of the engine is high as compared to when the rotational speed of the engine is low.

* * * * *